(12) United States Patent
Miller

(10) Patent No.: US 7,305,510 B2
(45) Date of Patent: Dec. 4, 2007

(54) MULTIPLE MASTER BUSES AND SLAVE BUSES TRANSMITTING SIMULTANEOUSLY

(75) Inventor: William V. Miller, Arlington, TX (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 414 days.

(21) Appl. No.: 10/877,376

(22) Filed: Jun. 25, 2004

(65) Prior Publication Data

US 2005/0289268 A1    Dec. 29, 2005

(51) Int. Cl.
*G06F 13/40*    (2006.01)
*G00F 13/00*    (2006.01)

(52) U.S. Cl. ............... 710/305; 710/306; 710/108; 710/200

(58) Field of Classification Search ......... 710/240, 710/113, 305, 306, 107, 108, 200
See application file for complete search history.

(56) References Cited

U.S. PATENT DOCUMENTS

| | | | | |
|---|---|---|---|---|
| 5,572,734 | A * | 11/1996 | Narad et al. | 710/200 |
| 6,393,500 | B1 * | 5/2002 | Thekkath | 710/35 |
| 6,633,944 | B1 | 10/2003 | Holm et al. | 710/306 |
| 6,687,773 | B1 | 2/2004 | Stewart et al. | 710/65 |
| 6,691,193 | B1 * | 2/2004 | Wang et al. | 710/200 |
| 6,985,985 | B2 * | 1/2006 | Moss | 710/240 |
| 6,990,541 | B2 * | 1/2006 | Clayton | 710/244 |
| 7,000,045 | B2 * | 2/2006 | Holm et al. | 710/110 |
| 7,058,740 | B2 * | 6/2006 | Watanabe et al. | 710/110 |
| 7,145,903 | B2 * | 12/2006 | Gutierrez | 370/362 |
| 7,174,406 | B1 * | 2/2007 | Abdallah et al. | 710/240 |
| 2001/0011312 | A1 * | 8/2001 | Chu | 710/64 |
| 2002/0023186 | A1 * | 2/2002 | Kim | 710/244 |
| 2002/0052995 | A1 | 5/2002 | Jahnke et al. | 710/305 |
| 2002/0062414 | A1 * | 5/2002 | Hofmann et al. | 710/110 |
| 2003/0101299 | A1 * | 5/2003 | Kondo et al. | 710/110 |
| 2004/0044812 | A1 * | 3/2004 | Holm et al. | 710/110 |
| 2005/0076169 | A1 * | 4/2005 | Modelski et al. | 710/100 |

* cited by examiner

*Primary Examiner*—Alford Kindred
*Assistant Examiner*—Ernest Unelus
(74) *Attorney, Agent, or Firm*—Thomas, Kayden, Horstemeyer & Risley

(57) ABSTRACT

A bus system, such as an internal bus system located within a digital device, is disclosed herein. The bus system comprises a plurality of master buses, each master bus connected to at least one master. The bus system also comprises a multi-bus interface connected to the plurality of master buses and a slave bus connected to the multi-bus interface. The multi-bus interface enables one master bus at a time to access the slave bus. Also disclosed herein are bus structures and methods for interfacing between master buses and slave buses.

10 Claims, 5 Drawing Sheets

MULTIPLE MASTER BUSES AND SLAVE BUSES TRANSMITTING SIMULTANEOUSLY

BACKGROUND

Many digital devices, such as those classified as System-On-Chip (SOC) devices, contain a bus structure where multiple masters and multiple slaves share a common internal bus. The internal bus can be defined as a standard interface between the masters and slaves, making the development and implementation of the masters and slaves relatively simple. The common internal bus also provides a flexible platform to which digital systems may be designed.

FIG. 1 illustrates a conventional bus structure 10 for an SOC device, in which a single internal bus 12 connects a plurality of masters 14 with a plurality of slaves 16. Also connected to the internal bus 12 is a bus arbiter 18, which monitors the internal bus 12 and grants ownership of the internal bus 12 to the masters 14 when needed. Once ownership of the bus is obtained, a master 14 is allowed to control a desired slave 16. Since the internal bus 12 provides a standard interface, any arbitrary number of masters 14 or slaves 16 can be connected to the internal bus 12.

Devices considered to be masters 14 include, for example, general purpose processors, digital signal processors (DSPs), universal bus interface (USB) host controller, DMA controller, LCD controller, etc. The slaves 16 may include devices such as memory controllers, serial peripheral interface (SPI) devices, real-time clocks, watchdog timers, pulse width modulators, interrupt controllers, UARTs, etc. As is well known in the art, any master 14 can seek ownership of the internal bus 12 by sending a request to the bus arbiter 18. When there are no conflicting requests, then the bus arbiter 18 normally grants ownership to the requesting master 14, and the master 14 gains ownership of the internal bus 12 and is allowed to access a particular slave 16. When multiple masters 14 request bus ownership at one time, then the bus arbiter 18 utilizes a predefined arbitration protocol to grant ownership to only one master at a time. The arbitration protocol is followed in order to guarantee that each master is serviced in a manner to maximize the performance and stability of the system as a whole.

The conventional bus structure 10 of FIG. 1 allows great flexibility in control, such that any master 14 can access or control any slave 16. In the case where there are five master and twenty slaves, there would be one hundred master/slave combinations possible. One disadvantage of this bus structure 10, however, is that while one master is accessing one slave, a second master cannot be simultaneously accessing a second slave. In this regard, only one master 14 and only one slave 16 can be active at any time. If two masters 14 attempt to gain ownership of the internal bus 12, then one master 14 must wait for the first one to complete the transaction before the second one can begin. Since the internal bus 12 is only capable of handling one master/slave connection at a time, the conventional bus structure 10 is therefore limited by the bandwidth of the internal bus 12. A disadvantage of this conventional bus structure 10 is that a bottleneck situation can result when multiple simultaneously requests are made.

A couple solutions have been proposed to overcome the deficiencies of the conventional system. One solution has been to increase the operating frequency of the internal bus. However, this complicates the design of the master/slave interfaces and typically would require redesigning the masters and slaves in order that they will be able to operate at the higher speed. Another solution has been to widen the associated data bus portion of the internal bus to increase the data bandwidth, allowing more information to be transferred during each cycle. However, this approach increases the amount of logic necessary to implement each master/slave interface on the internal bus. For those masters and/or slaves already in existence or those in the process of being designed, increasing the internal bus frequency or data width might require additional work to redesign the components.

A new internal bus structure, which eliminates the undesirable bottlenecks resulting from the conventional system, is desired. Such a new system should allow more than a single master/slave transaction to occur at a time while still maintaining the same amount of flexibility present in the prior art. It would further be beneficial for such a new system to operate with a frequency or a data bandwidth that does not necessarily have to be increased in order to achieve these objectives. The present disclosure provides a system to alleviate the bus bandwidth limitation of the prior art without increasing the operating frequency or data width of the internal bus interfaces.

SUMMARY

The present application is directed to bus systems, such as internal bus structures located within digital devices, and methods for interfacing between master buses and slave buses that have been formed by dividing a single bus structure. One exemplary embodiment of the present application is directed to an internal bus structure comprising a plurality of master buses and plurality of slave buses. At least one master is connected to each master bus and at least one slave is connected to each slave bus. The internal bus structure also comprises a plurality of multi-bus interfaces, each multi-bus interface corresponding to a respective slave bus. Furthermore, each multi-bus interface multiplexes the plurality of master buses to the respective slave bus.

Another embodiment disclosed herein is directed to a bus system comprising a plurality of master buses, where each master bus is connected to at least one master. The bus system also comprises a multi-bus interface connected to the plurality of master buses and a slave bus connected to the multi-bus interface. The multi-bus interface enables one master bus at a time to access the slave bus.

Also described in the disclosure herein is an embodiment of a multi-bus interface comprising means for receiving requests from a plurality of master buses, means for selecting a request from one of the plurality of master buses, and means for transmitting the selected request to a slave bus.

A method for interfacing buses is also described, wherein the method comprises receiving a first request from a first master on a first master bus to access a first slave on a first slave bus. The method also includes receiving a second request from a second master on a second master bus to access a second slave on a second slave bus. Finally, the method comprises enabling the first master to transact with the first slave at the same time that the second master transacts with the second slave.

BRIEF DESCRIPTION OF THE DRAWINGS

Many aspects of the embodiments of the present disclosure can be better understood with reference to the following drawings. Like reference numerals designate corresponding parts throughout the several views.

DETAILED DESCRIPTION

To alleviate the internal bus bandwidth limitations of the prior art without increasing operating frequency or data width, the present application discloses embodiments of systems in which the internal bus is split into two or more buses. Preferably, the internal bus is split up into at least four buses—at least two buses referred to herein as "master buses" and at least two buses referred to herein as "slave buses." In addition to splitting the internal bus, the design of the internal bus structure of the present application also includes a bus arbiter for each master bus and devices referred to herein as "multi-bus interfaces," which connect the master buses to respective slave buses. It should be noted, however, that this bus structure provides the advantage that the masters or slaves themselves do not require a change in design. In the case where a large number of masters and slaves already exist in a digital device, such as a System-On-Chip (SOC) device, the approach conceptualized in the present application provides an efficient way to increase the bandwidth of the internal bus by allowing multiple master/slave transactions to occur simultaneously. Another advantage of the present application is that the internal bus structures do not require an increase in operating frequency or an increase in the data width.

Figure 1:
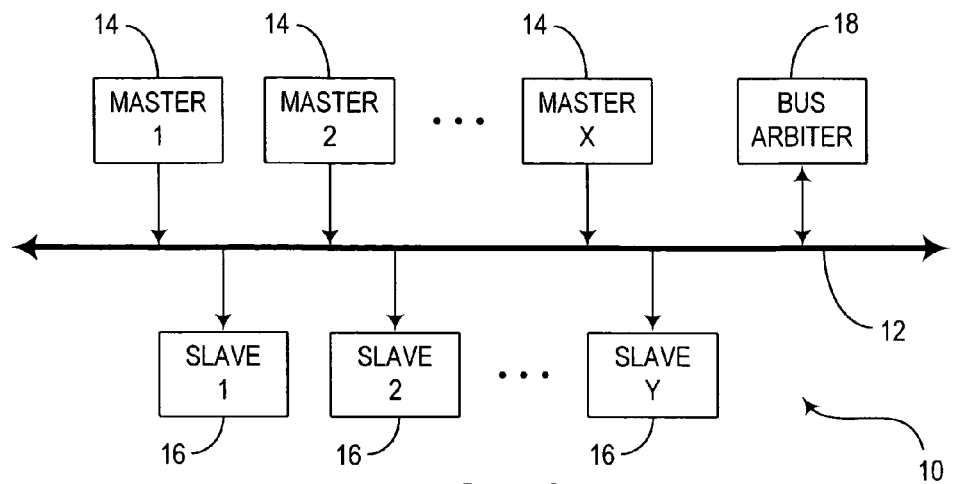
FIG. 1 illustrates a schematic block diagram of a conventional bus structure, in which a single internal bus connects a plurality of masters with a plurality of slaves.
Figure 2:
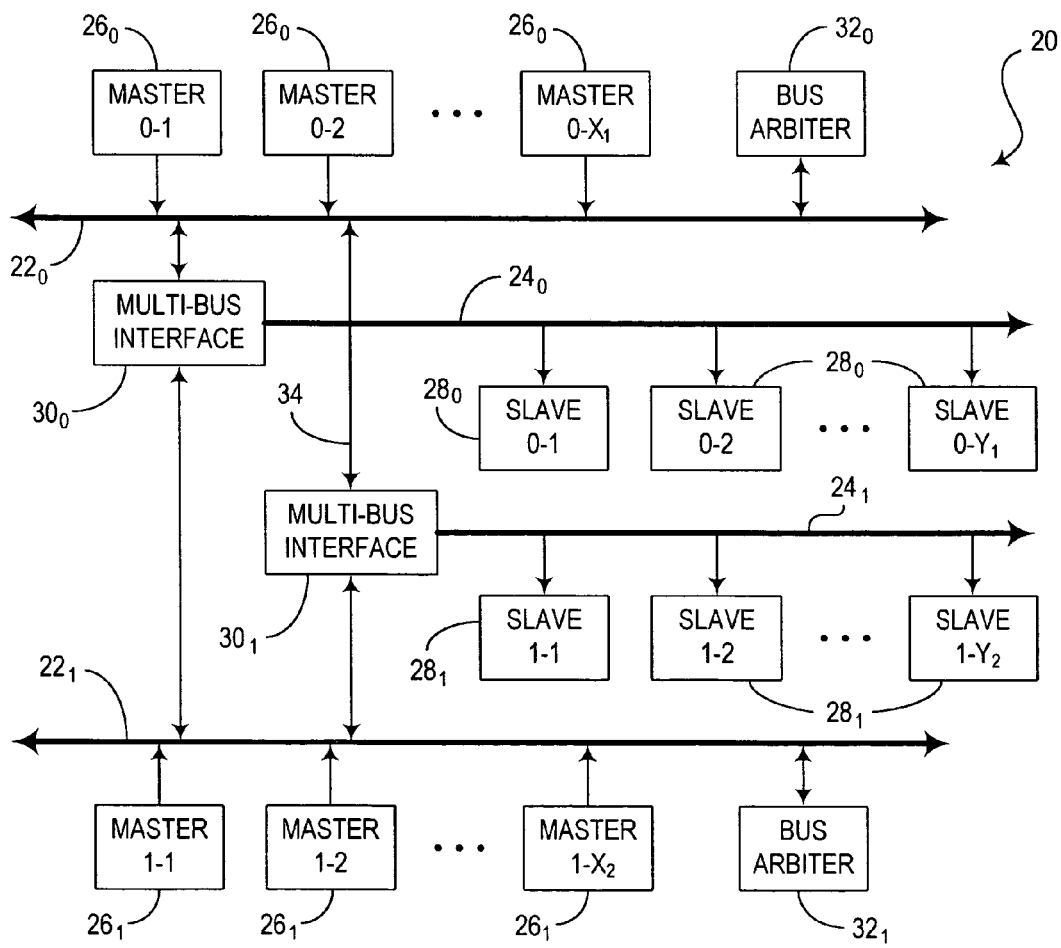
FIG. 2 is a schematic block diagram of a first embodiment of an internal bus structure according to the teachings of the present application.

FIG. 2 illustrates an exemplary embodiment of an internal bus structure 20 in accordance with the teachings of the present disclosure. Instead of a single internal bus, the internal bus structure 20 is split such that it includes two master buses $22_0, 22_1$ and two slave buses $24_0, 24_1$. A first group of masters $26_0$ is connected to the first master bus $22_0$ and a second group of masters $26_1$ is connected to the second master bus $22_1$. Likewise, a first group of slaves $28_0$ is connected to the first slave bus $24_0$ and a second group of slaves $28_1$ is connected to the second slave bus $24_1$. Any number of masters 26 can be connected to the master buses 22 and any number of slaves 28 can be connected to the slave buses 24. At an extreme, however, a single master or slave could be configured alone on its own bus.

The internal bus structure 20 of FIG. 2 further includes first and second multi-bus interfaces $30_0, 30_1$. The first multi-bus interface $30_0$ is connected to the first slave bus $24_0$ and the second multi-bus interface $30_1$ is connected to the second slave bus $24_1$. Any master 26, whether located on the first or second master buses $22_0, 22_1$, can access any slave 28 via one of the first or second multi-bus interfaces $30_0, 30_1$.

It will be evident upon reading and understanding the present application that the internal bus structure 20 of FIG. 2 allows two masters 26 to simultaneously access two slaves 28, provided that the two masters 26 are located on opposite master buses 22 and the two slaves 28 are located on opposite slave buses 24. For instance, MASTER 0-1 might access SLAVE 0-2 through the first multi-bus interface $30_0$ at the same time that MASTER 1-$X_2$ might access SLAVE 1-1 through the second multi-bus interface $30_1$. In this example, it should be noted that there are no conflicting or overlapping connection paths. Instead, the master/slave connections are parallel to each other and thus the corresponding signals between the master/slave pairs can be transmitted simultaneously without interfering. In this regard, the system of FIG. 2 effectively doubles the bandwidth of the internal bus by allowing simultaneous master/slave interactions. Also, it should be noted that the flexibility of the system of FIG. 2 is not compromised since any master 26 can still access any slave 28.

FIG. 2 further includes bus arbiters $32_0, 32_1$ connected to master buses $22_0, 22_1$, respectively. Bus arbiter $32_0$ maintains control of master bus $22_0$ such that only one master $26_0$ is given ownership of master bus $22_0$ at any time. Likewise, bus arbiter $32_1$ maintains control of master bus $22_1$ such that only one master $26_1$ is given ownership of master bus $22_1$ at a time. The multi-bus interfaces 30 are utilized in cooperation with the bus arbiters 32 to enhance any existing arbitration when simultaneous requests are made. Each multi-bus interface 30 negotiates the various master/slave connections using a multiplexing technique to connect one of the two master buses to its respective slave bus.

In the internal bus structure shown in FIG. 2, two levels of arbitration are in effect. First, a master 26 requests ownership of the respective master bus 22 to which it is connected. This request is made to the bus arbiter 32, which grants to the master 26 ownership of that master bus according to a particular arbitration protocol. The arbitration protocol defines the order of priority should two or more masters request ownership simultaneously. Once the master 26 is granted ownership of the respective master bus 22, the master 26 then requests ownership of the desired slave bus 24 via the respective multi-bus interface 30 connected to that slave bus 24. When the master 26 is granted access by both the bus arbiter 32 and the multi-bus interface 30, then the master 26 is free to communicate with the desired slave 28 on that slave bus 24.

It has been observed that some masters 26 typically only access certain slaves and rarely or never access the other slaves. In this case, the masters 26 and slaves 28 can be grouped in a way such that the connection from the master bus 22 to the multi-bus interface 30 of the unneeded slave bus 24 might be omitted. For example, if the masters $26_0$ on master bus $22_0$ only access slaves $28_0$ on slave bus $24_0$ and never access slaves $28_1$ on slave bus $24_1$, then connection 34 from master bus $22_0$ to multi-bus interface $30_1$ may be omitted. However, since it is anticipated that different customers might have varying needs, such isolation restricting a group of masters from ever accessing those slaves might be problematic for some customers who might wish to utilize master/slave transactions that may initially seem useless. Therefore, although such isolation may appear to simplify the circuitry of the system, it is preferred to leave all connections intact between the master buses 22 and the multi-bus interfaces 30. Thus, with all connections intact, all masters would remain capable of accessing all slaves, thereby maintaining the same level of flexibility of the prior art systems.

Regarding the grouping of masters and slaves on respective buses, a circuit designer of the internal bus structure 20 may group the masters in a manner such that two masters that might tend to need ownership at the same time would be positioned on different master buses. The same concept applies to the slaves such that certain slaves that might tend to be accessed simultaneously would be placed on different slave buses. Also, masters that might typically operate at different times might be intentionally placed on the same master bus since they would not normally require ownership of the same master bus at the same time. Alternatively, the masters and slaves can be grouped in such a manner that masters having a tendency to mostly access a group of slaves would be located on the same master bus while the associated slaves are grouped on the same slave bus, allowing all other masters and slaves located on the other buses to carry out parallel communications. Other criteria might be taken into account when designing the internal bus structure 20 to group the masters and/or slaves on particular buses in order to maximize the efficiency of the system.

Figure 3:
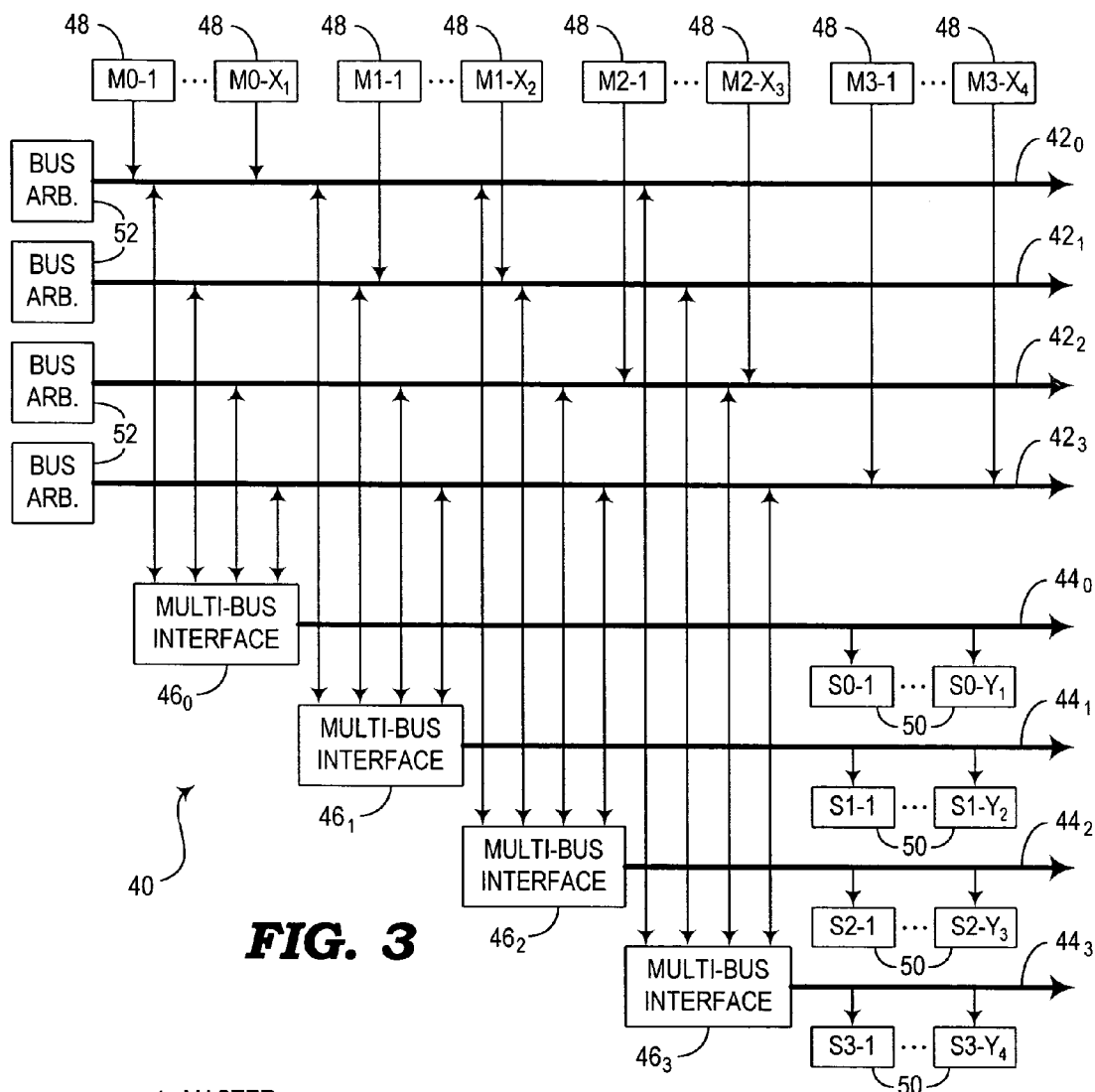
FIG. 3 is a schematic block diagram of a second embodiment of an internal bus structure connecting four master buses with four slave buses.

FIG. 3 shows another embodiment of an internal bus structure 40 in which four master buses $42_0$, $42_1$, $42_2$, $42_3$ and four slave buses $44_0$, $44_1$, $44_2$, $44_3$ are connected via four multi-bus interfaces $46_0$, $46_1$, $46_2$, $46_3$. Alternatively, this embodiment might be configured to include any number of master buses 42 and any number of slave buses 44. Preferably, the internal bus structure 40 includes two, three, four, or five master buses and slave buses. Also, the number of master buses does not necessarily have to be the same as the number of slave buses. For instance, the numbers of master buses 42 and slave buses 44 may be different if the grouping of masters and slaves provides better results, such as, for example, greater efficiency of the overall system. In this embodiment, however, four master buses 42 and four slave buses 44 are illustrated in order to more easily describe the concepts of the present application.

Each master bus 42 is connected to a number of masters 48 and each slave bus 44 is connected to a number of slaves 50. Also, any number or combination of masters 48 can be connected to each master bus 42 and any number or combination of slaves 50 can be connected to each slave bus 44, as explained above with respect to FIG. 2.

Also similar to the embodiment of FIG. 2, one multi-bus interface 46 is connected to each slave bus 44 and allows access to that slave bus 44 from any master bus 42. In the situation where a designer may recognize that some groups of masters 48 on a particular master bus 42 only access certain slaves 50 on a particular slave bus 44, the connection or connections between the master bus 42 and one or more corresponding multi-bus interfaces 46 of unneeded slave buses 44 may be omitted. Again, it is preferred that these connections be left intact to maintain optimal flexibility.

Not only can the multi-bus interfaces 46 negotiate which master bus 42 is granted ownership, but the multi-bus interfaces 46 may also include an arbitration protocol that negotiates which of the masters themselves are granted priority ahead of other masters. Therefore, the multi-bus interface 46 may arbitrate based on the master buses, based on the masters themselves, or based on a combination of the master buses and masters. As should be realized from an understanding of the present application, the type of arbitration protocol utilized by the multi-bus interfaces 46 is arbitrary and can be modified to any suitable arbitration technique without departing from the spirit or scope of the present application.

Also concerning arbitration, a slave 50 configured as a memory controller, for instance, can use an interleaving arbitration protocol to allow multiple master buses to access different locations in memory. In this sense, the memory controller can process two requests simultaneously by accessing the different memory locations for different master buses in an interleaved fashion.

The internal bus structure of FIG. 3 further includes bus arbiters 52, each connected to a respective master bus 42. The bus arbiters 52 provide the first level of arbitration to grant ownership of the master bus to requesting masters on that bus. The bus arbiters 52 monitor the master bus and grant ownership requests accordingly. The bus arbiters 52 operate in conjunction with the multi-bus interfaces 46, which provides the second level of arbitration. If a particular master bus 42 only includes one master and therefore does not have to share the bus with other masters, then the bus arbiter for this master bus is not needed and may be omitted. In this case, the multi-bus interface 46 conducts the only arbitration for such a master.

Figure 4:
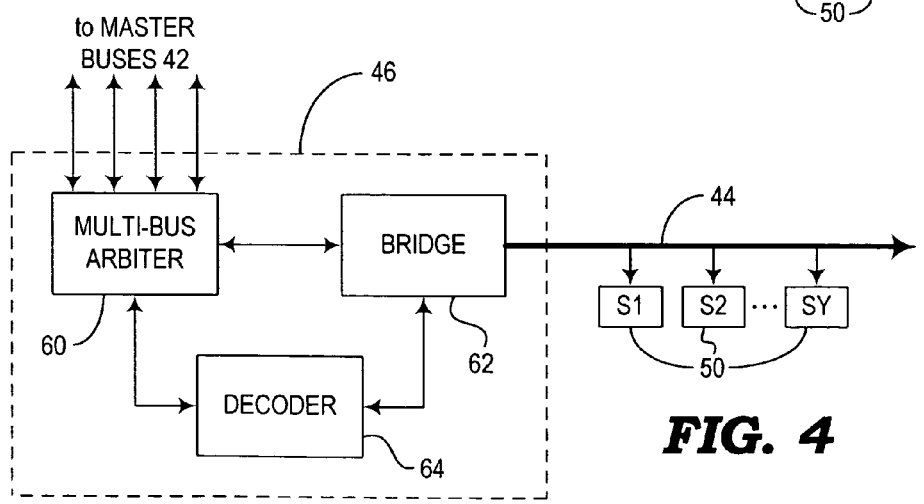
FIG. 4 is a schematic block diagram of an embodiment of one of the multi-bus interfaces shown in FIG. 3.

FIG. 4 is a block diagram of an embodiment of one of the multi-bus interfaces 46 shown in FIG. 3. Although the multi-bus interface 46 is illustrated with connections to four master buses 42, the multi-bus interface 46 may alternatively be configured for connection to any number of master buses depending on the number of master buses used in the system. Although the following description defines an internal bus structures having four master buses and four slave buses, it should be noted that this description is merely for illustrative purposes only and is not meant to limit the present application since any number of master buses and slave buses may be utilized. Also, the following description corresponds to the embodiment of FIG. 3 and is also used to simplify the explanation of the multi-bus interface 46 and other related circuitry as described below with reference to FIGS. 7-11.

The multi-bus interface 46 according to the embodiment of FIG. 4 includes a multi-bus arbiter 60, a bridge 62, and a decoder 64. The multi-bus arbiter 60 includes four inputs connected to the four master buses $42_0$, $42_1$, $42_2$, $42_3$ for receiving requests to access a respective slave bus 44. When multiple requests for ownership of the slave bus are received simultaneously, the multi-bus arbiter 60 stores the requests and grants access to the slave bus 44 in an order defined by a predetermined arbitration protocol. Again, possible arbitration protocols are defined in more detail below. According to whatever arbitration protocol is being utilized, the multi-bus arbiter 60 appropriately establishes a timely connection between a requesting master and its slave 50.

Once the multi-bus arbiter 60 establishes this master/slave connection, the master is allowed to transfer data with a particular slave 50 via the multi-bus arbiter 60 and bridge 62. The bridge 62 provides a conversion path from the master bus to the slave bus. The simplest conversion is when the master bus and the slave bus are of the same type. For example, the master bus and slave bus may both be configured as advanced high-performance buses (AHBs). Alternatively, the master bus and the slave bus may use different protocols, such as, for example, in a case where the master bus is configured as an AHB and the slave bus is configured as an advanced peripheral bus (APB). The bridge 62 may also provide any other type of conversion needed to allow proper communication between the master and slave.

The decoder 64 works in conjunction with the multi-bus arbiter 60 and bridge 62 to help determine the identity of a slave 50 for which a request is made. The decoder 64 decodes address information to properly identify the various slaves 50 on the slave bus 44. Alternatively, the multi-bus interface 46 of FIG. 4 can be configured without the decoder 64 in the case where the same decoding function may be provided by another element in a different location within the system or if a corresponding decoder is provided elsewhere in the system.

Figure 5:
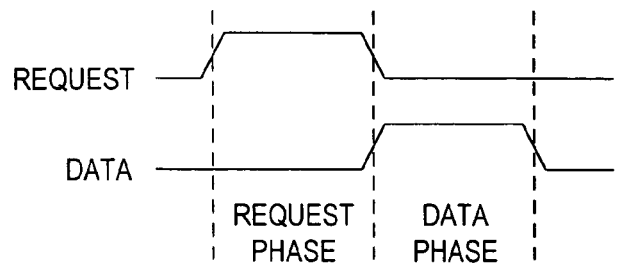
FIG. 5 is a timing diagram of a request signal and a data signal when only one request at a time is made.

FIG. 5 illustrates a timing diagram of a master/slave transaction when no conflicting requests are made. After a master is granted ownership of its respective master bus in the first level of arbitration, the master transmits a request to the multi-bus interface 46 (FIG. 3) for ownership of the respective slave bus during the second level of arbitration. During this second level, the request is received during a request phase. Immediately after the request phase, data is transferred during the data phase. For instance, if the master/slave transaction is a write command, the master transfers data to the slave, and if the transaction is a read command, the slave transfers data to the master.

Figure 6:
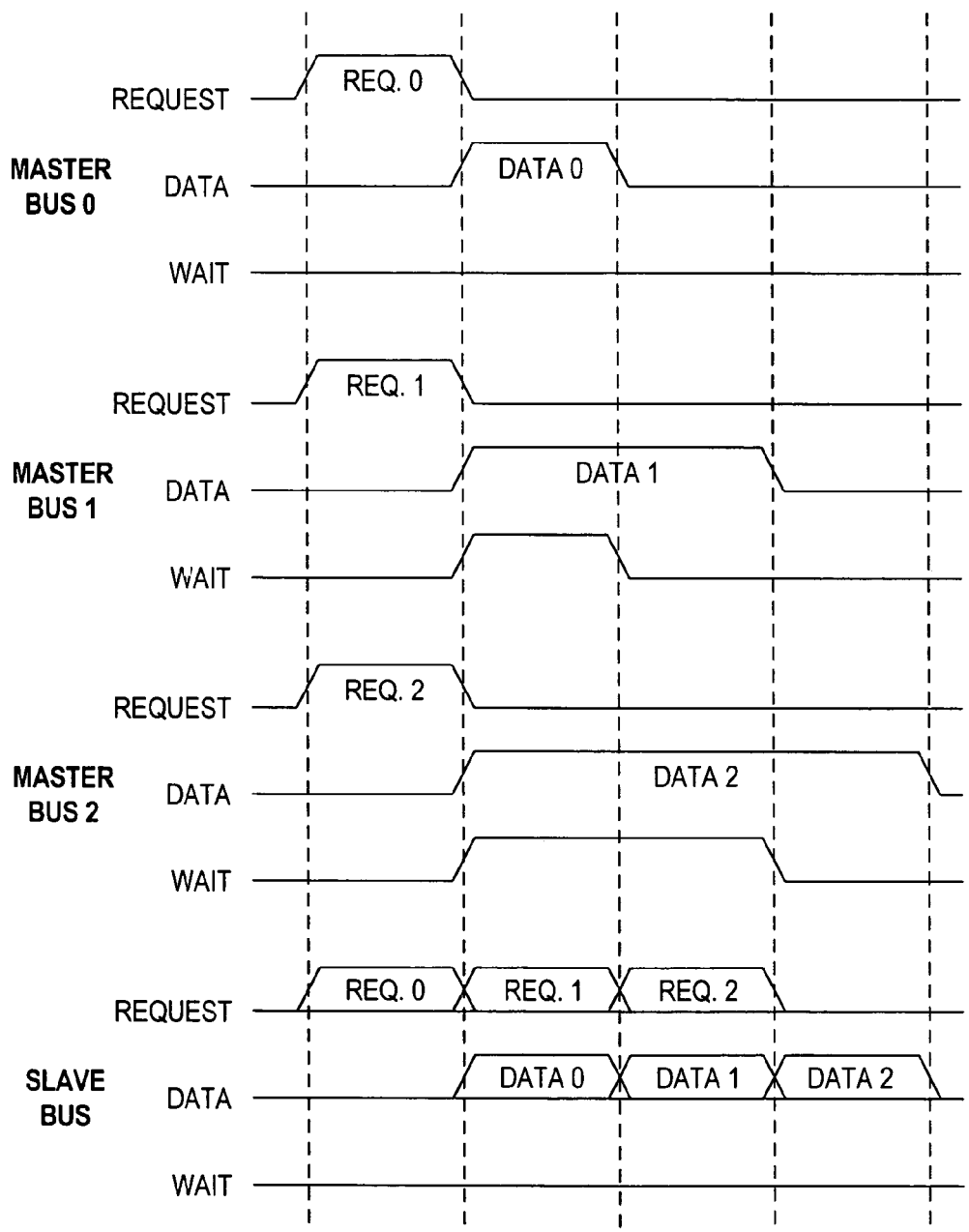
FIG. 6 is a timing diagram of request signals, data signals, and wait signals when three simultaneous requests are made.

FIG. 6 illustrates a timing diagram when three simultaneous requests from three different master buses are made to a slave bus. In this example, it is assumed that master bus 0, master bus 1, and master bus 2 are requesting at the same time and that the order of priority places master bus 0 with the highest priority, master bus 1 with the second highest priority, and master bus 2 with the lowest. It should be noted that the request signals from the three master buses are received simultaneously. These requests are received by the multi-bus interface, which stores the requests if necessary. Also note that the slave bus processes the requests in the order of priority, one after another, such that the simultaneous requests can be handled individually.

The multi-bus interface sends a wait signal to the master buses, when necessary, if the master bus does not have the highest priority. In FIG. 6, since master bus 0 has the highest priority, the wait signal does not go high and the data is transferred in the next transfer cycle (see DATA 0 on the slave bus). Also, master bus 1 is given a wait signal to wait one transfer cycle and master bus 2 is given a wait signal to wait two transfer cycles. The master buses 1 and 2 extend the data phase to one transfer cycle past the end of the wait signal. During the time that the wait signal is active (logic high), the data on the master bus might include don't-care (X) values until the wait signal is again inactive (logic low), at which time the data would be valid. After the wait times, the data on master bus 1 is transferred with the slave bus as DATA 1 and the data on master bus 2 is transferred with the slave bus as DATA 2. Additional wait time can typically be required by the slave bus itself and may lengthen the wait signal to the master buses, which would thereby extend the wait signal and data signal for additional transfer cycles.

Figure 7:
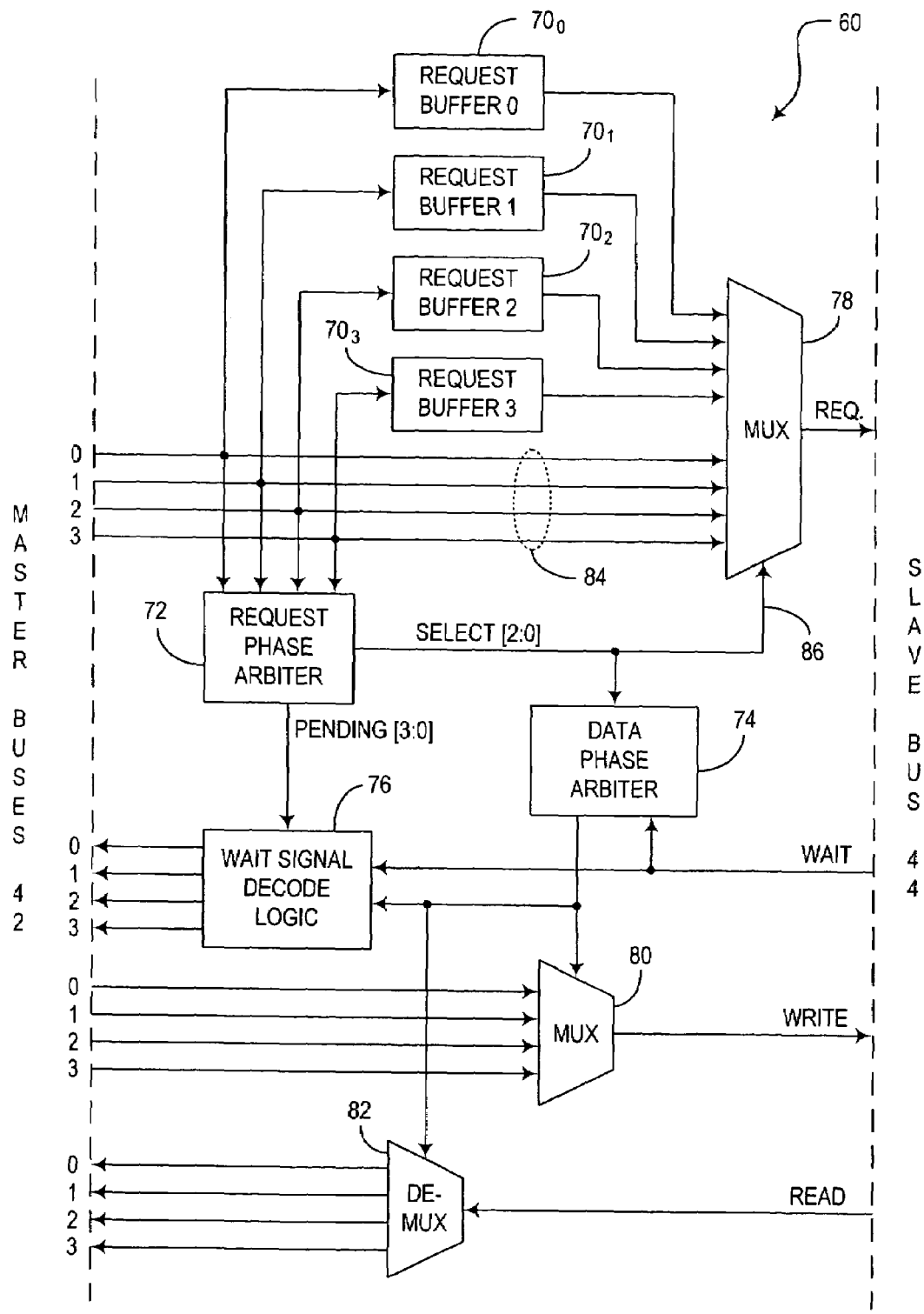
FIG. 7 is a schematic block diagram of an embodiment of the multi-bus arbiter shown in FIG. 4.

FIG. 7 is an exemplary embodiment of the multi-bus arbiter 60 shown in FIG. 4. The multi-bus arbiter 60 of FIG. 7 includes a number of request buffers $70_0$, $70_1$, $70_2$, $70_3$ corresponding to the number of master buses in the system, which in this example is four. The multi-bus arbiter 60 also includes a request phase arbiter 72, a data phase arbiter 74, wait signal decode logic 76, multiplexers 78, 80, and demultiplexer 82. Embodiments of the request buffers 70, the request phase arbiter 72, the data phase arbiter 74, and the wait signal decode logic 76 are described in more detail with reference to FIGS. 8-11, respectively.

Referring to FIG. 7, each request buffer 70 is capable of receiving requests from a respective master bus 42 and storing the request until it can be processed. The requests from the master buses 42 refer to requests from masters that have already gained control of their respective master buses 42 and are attempting to gain control of a particular slave bus 44 during the second arbitration stage. If multiple requests are made either simultaneously or in some way overlapping in time, then at least one master bus may be required to wait so as to avoid the occurrence of multiple signal interference on the slave bus 44. With this configuration, the request buffers 70 are capable of latching onto requests from the master buses so that the master buses do not have to drive the request signals continually.

Multiplexer 78 includes, for example, eight inputs, four of which receive requests along direct connections 84 from the master buses and the other four of which receive the same requests as they are stored in the request buffers 70. If simultaneous requests are received, the multiplexer 78 is triggered to allow the request from the highest priority master bus along one of the direct connections 84 to pass on through. If a master bus is not the highest priority bus, then its request is stored on the respective request buffer 70 until higher priority buses finish their transactions. The lower priority request is then fed through the multiplexer 78 at the appropriate time. The responsibility of determining this priority falls on the request phase arbiter 72 as is explained in more detail below.

The request phase arbiter 72 also receives the requests from the master buses 42. Upon determining the order and timeframe of requests, the request phase arbiter 72 provides a select signal on line 86 to a selection input of the multiplexer 78 to designate which request has been selected for processing. The request phase arbiter 72 also notifies the multiplexer 78 whether to pass the direct request along one of the direct connections 84 or to pass a buffered request. The request phase arbiter 72 also sends PENDING signals to the wait signal decode logic 76 indicating from which master buses requests have been received, but have yet to be selected for processing.

The data phase arbiter 74 receives the SELECT signal from the request phase arbiter 72 indicating which master bus is selected for ownership of the slave bus 44. Also, the data phase arbiter 74 receives a wait signal from the slave bus itself indicating whether or not the slave bus is ready to be accessed. For instance, if the slave being accessed is a memory device or memory controller, the slave bus may require wait time to configure address locations for reading or writing. When the slave bus indicates that it is ready to begin data transfer, the data phase arbiter 74 outputs a select signal to either the multiplexer 80 or demultiplexer 82 depending on whether a write command or a read command is in order. For a write command, the multiplexer 80 receives signals at the four inputs and the data phase arbiter 74 selects the input path from the selected master bus from which write data is transmitted to the slave. Alternatively, for a read command, the demultiplexer 82 receives the data signal to be read from the slave and the data phase arbiter 74 selects an output path to the selected master bus to which read data is transmitted.

The wait signal decode logic 76 receives the PENDING signal from the request phase arbiter. This signal indicates to the wait signal decode logic 76 which master buses must wait. The wait signal decode logic 76, in turn, provides feedback wait signals to the master buses to notify the non-selected master buses that they must wait before ownership can be obtained. The wait signal decode logic 76 also receives the WAIT signal from the slave bus itself when the slave bus is not ready to be accessed. The feedback wait signals provided by the wait signal decode logic 76 also takes into account the wait time that the slave bus needs. Therefore, the wait signal decode logic 76 provides a wait signal dependent on the occurrence of one of two conditions. The first condition is that the request from a particular master bus has been received but it has not yet worked its way up in the order of priority. The second condition is that the request has been selected for processing, but the slave bus is not yet ready.

Figure 8:
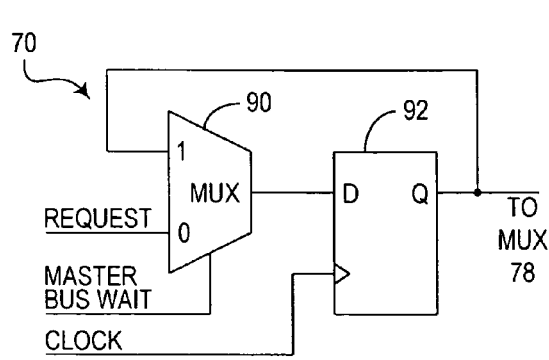
FIG. 8 is a schematic block diagram of an embodiment of one of the request buffers shown in FIG. 7.

FIG. 8 is a block diagram of an embodiment of one of the request buffers 70 shown in FIG. 7. It should be understood that other embodiments of request buffers may be designed by one of skill in the art to achieve the same functions as described herein. According to the embodiment of FIG. 8, logic is illustrated that includes a multiplexer 90 and a D-type flip-flop 92. At the "0" input of the multiplexer 90, the request signal from the respective master bus is received. The selection input of the multiplexer 90 is connected to receive the wait signal generated by the multi-bus arbiter 60 and fed back to the respective master bus in accordance with the timing diagram of FIG. 6. Initially, the wait signal is inactive (logic 0) indicating a "ready" state. In this case, the request signal received at input 0 is passed through the multiplexer 90 to the flip-flop 92. The Q output of the flip flop 92, which maintains the request signal, is fed back to the "1" input to the multiplexer 90.

When the request buffer 70 receives a request signal, the multi-bus arbiter 60 senses that a request has been received and thereby creates a wait signal (logic 1), according to the diagram of FIG. 6. This wait signal is provided to allow enough time to determine if other requests are pending and to determine an order of requests if simultaneous requests are received. The logic 1 WAIT signal is input to the selection input of the multiplexer 90 thereby selecting the feedback signal at input "0" of the multiplexer 90. This feedback signal corresponds to the original request signal. In this respect, the request signal is continuously fed back in a loop, thereby being stored by the request buffer 70 while the wait signal is a logic 1. Even when the request signal is no longer being transmitted by the master bus to the "0" input of the multiplexer 90, the request buffer 70 is capable of saving the request so that the requesting master does not need to continue driving the request.

After the request is eventually selected at the output of the request buffer 70, the multi-bus arbiter 60 senses that the request has been selected for processing and sends a logic 0 WAIT signal to the selection input of the multiplexer 90, thereby clearing the originally stored request and enabling the request buffer 70 to receive a new request.

Figure 9:
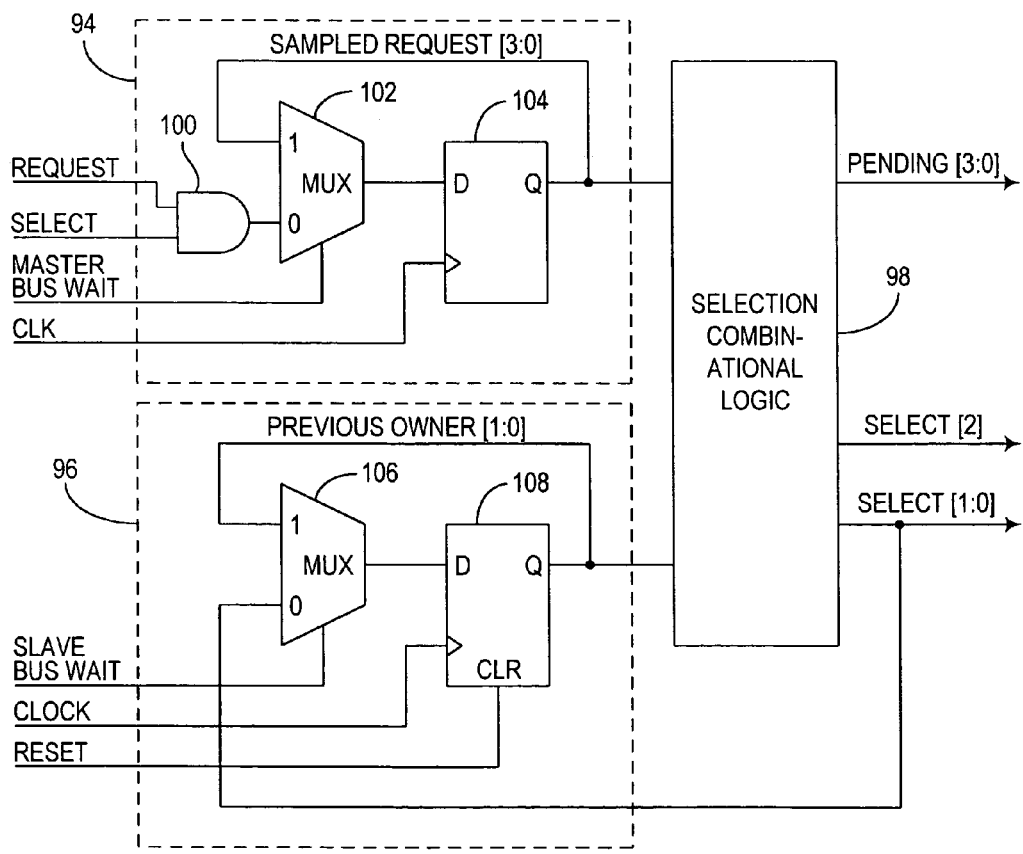
FIG. 9 is a schematic block diagram of an embodiment of the request phase arbiter shown in FIG. 7.

FIG. 9 is an embodiment of the request phase arbiter 72 shown in FIG. 7. The request phase arbiter 72 according to this embodiment includes a sampled request circuit 94, a previous ownership circuit 96, and a selection combinational logic circuit 98. The logic components of the sampled request circuit 94 include an AND gate 100, multiplexer 102, and D-type flip-flop 104. This circuit resembles the circuitry of FIG. 8 with the addition of the AND gate 100 and operates in a manner similar to that of FIG. 8 as described above for storing a signal during a wait time. Therefore, except for the AND gate 100, operation of this circuit will not be repeated herein for the sake of brevity. The AND gate 100 receives the request signal from the master bus and a select signal from the decoder 64 to indicate whether the proper slave bus has been addressed. When both inputs are high, the request signal is sampled or buffered as described above.

The sampled request circuit 94, as illustrated, is a representative example of circuitry capable of handling all the requests from all the master buses. Multiple versions of the sampled request circuit 94 are needed to fulfill a one-to-one relationship with each master bus so that each master bus request can be handled separately. Therefore, if the internal bus system is configured with four master buses, for example, then four versions of the sampled request circuit 94 are created, one for each master bus. For simplicity, one version is shown and the SAMPLED REQUEST [3:0] signal represents four bits 3:0 of sampled requests from the four master buses $42_0$, $42_1$, $42_2$, $42_3$. Since each master bus can request at any time, any combination of requests from the master buses can be sampled. For example, a binary value 1011 for the SAMPLED REQUEST [3:0] indicates that Master Bus 0 ($42_0$), Master Bus 1 ($42_1$), and Master Bus 3 ($42_3$) are requesting.

Regarding the previous ownership circuit 96, the signal PREVIOUS OWNER [1:0] is an encoded signal that represents one of a number of master buses. A single bit can be encoded to represent one of two master buses, and in this case, only one version of the previous ownership circuit 96 is therefore required for an internal bus system with two master buses. Only two bits are required for an internal bus system with three or four master buses, and therefore two version of the previous ownership circuit 96 would be used. Three versions would be required for a system with five to eight master buses, and so on. In FIG. 9, as illustrated, the previous ownership circuit 96 includes a PREVIOUS OWNER [1:0] signal having two bits for designating one of four possible master buses that could be designated as the previous owner of the slave bus. For example, the binary value 00 indicates that Master Bus 0 was the previous owner; 01 indicates that Master Bus 1 was the previous owner; 10 indicates that Master Bus 2 was the previous owner; and 11 indicates that Master Bus 3 was the previous owner. Since only one master bus can be the owner at any time, this encoding is possible in order to simplify the circuitry.

The request phase arbiter 72 further includes selection combinational logic 98, which includes logic components for processing the SAMPLED REQUEST [3:0] signal from the sampled request circuit 94 and the PREVIOUS OWNER [1:0] signal from the previous ownership circuit 96. The selection combinational logic 98 processes these signals to output a PENDING [3:0] signal. It should be noted that a high PENDING signal indicates that a request on a certain master bus has been received and stored, yet the request has not yet been carried out. If a request from a certain master bus had been previously selected, then the request is no longer considered to be pending. The PENDING [3:0] is output according to the truth tables below.

| PREVIOUS OWNER [1:0] | SAMPLED REQUEST [0] | PENDING [0] |
|---|---|---|
| not "00" (i.e., 01, 10, 11) | 1 | 1 |
| All Other Cases | | 0 |

| PREVIOUS OWNER [1:0] | SAMPLED REQUEST [1] | PENDING [1] |
|---|---|---|
| not "01" (i.e., 00, 10, 11) | 1 | 1 |
| All Other Cases | | 0 |

| PREVIOUS OWNER [1:0] | SAMPLED REQUEST [2] | PENDING [2] |
|---|---|---|
| not "10" (i.e., 00, 01, 11) | 1 | 1 |
| All Other Cases | | 0 |

| PREVIOUS OWNER [1:0] | SAMPLED REQUEST [3] | PENDING [3] |
|---|---|---|
| not "11" (i.e., 00, 01, 10) | 1 | 1 |
| All Other Cases | | 0 |

In addition, the selection combination logic 98 outputs a three-bit SELECT [2:0] signal. The SELECT signal include a first bit SELECT [2] on one output and second and third bits SELECT [1:0] on another output. The three-bit SELECT signal is sent along line 86 (FIG. 7) to the selection input of the multiplexer 78 for selecting one of the eight inputs. The SELECT [2] bit indicates whether a request is selected from the direct connections 84 (when SELECT [2] is a logic 0) or from an input from the request buffers 70 (when SELECT [2] is logic 1). The two-bit SELECT [1:0] indicates which request from the four master buses is being selected.

Again, in this exemplary embodiment of FIG. 9, it is assumed that the internal bus system includes four master buses and four slave buses, as is illustrated in FIG. 3. With this example, the sampled request circuit 94 would be repeated four times and the previous ownership circuit 96 would be repeated twice. The selection combinational logic 98 can be configured to output any SELECT [2:0] signal according to any desirable arbitration protocol. For instance, a "fixed" priority type of arbitration can be used such that one particular master bus always has the highest priority if there are multiple simultaneous requests. With fixed priority, all other master buses are ordered from highest to lowest priority and their requests are processed in that order. Another arbitration technique is a "rotating" priority technique in which the priority is given to a different master bus each time simultaneously requests are made. After a master bus has been the previous owner, then this master bus is dropped to the lowest priority. Alternatively, another arbitration protocol may involve a hybrid of fixed priority and rotating priority. In this case, one or more master buses may be fixed as the highest priority buses while the remaining master buses rotate priority. The truth table below shows the SELECT signal [2:0], based on PREVIOUS OWNER [1:0] and SAMPLED REQUEST [3:0] signal inputs, for a possible rotating priority scheme.

| PREV. OWNER | SAMPLED REQ. | SELECT [2] | SELECT [1:0] |
|---|---|---|---|
| 00 | XX1X | 1 | 01 |
| 00 | X10X | 1 | 10 |
| 00 | 100X | 1 | 11 |
| 00 | 000X | 0 | 00 |
| 01 | X1XX | 1 | 10 |
| 01 | 10XX | 1 | 11 |
| 01 | 00X1 | 1 | 00 |
| 01 | 00X0 | 0 | 01 |
| 10 | 1XXX | 1 | 11 |
| 10 | 0XX1 | 1 | 00 |
| 10 | 0X10 | 1 | 01 |
| 10 | 0X00 | 0 | 10 |

-continued

| PREV. OWNER | SAMPLED REQ. | SELECT [2] | SELECT [1:0] |
|---|---|---|---|
| 11 | XXX1 | 1 | 00 |
| 11 | XX10 | 1 | 01 |
| 11 | X100 | 1 | 10 |
| 11 | X000 | 0 | 11 |

It should be noted that the previous bus owner, indicated by the PREVIOUS OWNER signal, becomes the lowest priority bus on the next go around using this rotating priority scheme. However, if a new request is made by only the previous owner and there are no other requests at the same time, the SELECT [2] signal is logic "0" indicating that the request from this same master bus is passed through without buffering.

Figure 10:
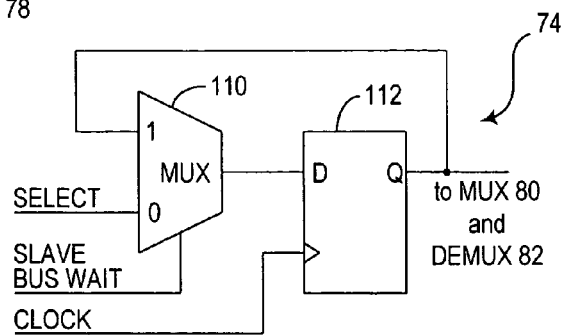
FIG. 10 is a schematic block diagram of an embodiment of the data phase arbiter shown in FIG. 7.

FIG. 10 is a logic block diagram of an embodiment of the data phase arbiter 74 shown in FIG. 7. The logic of this embodiment is similar to the logic of FIG. 8 for storing a signal. However, in FIG. 10, the multiplexer 110 receives a SELECT [1:0] signal from the request phase arbiter 72, indicating which master bus is selected for data transfer. When the slave bus sends a logic 1 WAIT signal, the SELECT signal is held in the data phase arbiter 74 and is output to the multiplexer 80 and demultiplexer 82 (FIG. 7) for selecting the master bus involved in the pending data transmission. Thereafter, when the WAIT signal from the slave bus is a logic 0, the SELECT signal will be clocked into the D-type flip-flop 112 and is utilized by the multiplexer 80 or demultiplexer 82 during the following clock period.

Figure 11:
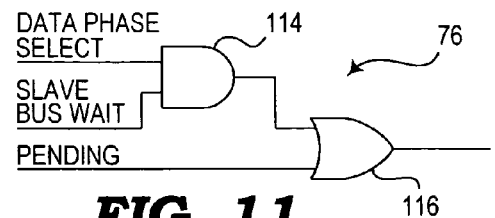
FIG. 11 is a schematic block diagram of an embodiment of the wait signal decode logic shown in FIG. 7.

FIG. 11 is an embodiment of the wait signal decode logic 76 shown in FIG. 7. The wait signal decode logic 76 includes an AND gate 114 and an OR gate 116. The inputs to the AND gate 114 receive a decode of the SELECT [1:0] signal from the data phase arbiter 74, indicating which master bus is presently selected, and the WAIT signal from the slave bus, indicating whether or not the slave bus is ready to be accessed. The output of the AND gate 114 provides an input to the OR gate 116, which also receives the appropriate PENDING signal bit from the request phase arbiter 72. The output of the wait signal decode logic 76 is a Master Bus WAIT signal that is fed back to the respective master bus to indicate that the master bus must wait before data transfer can be achieved.

Two conditions may cause the wait signal decode logic 76 to send an active (logic high) Master Bus WAIT signal. First, if a request is pending, or, in other words, if a request has been received, is stored, and has not been selected, then the OR gate 116 provides a logic high Master Bus WAIT signal. In a second condition, if the request has been selected (Data Phase SELECT is high), but the slave is not ready (Slave Bus WAIT is high), then the OR gate 116 also provides a logic high Master Bus WAIT signal. The Master Bus WAIT signal remains high until the Slave Bus WAIT signal is low, indicating that the slave bus is ready.

It should be emphasized that the above-described embodiments of the present application are merely possible examples of implementations set forth for a clear understanding of the principles of the present application. Many variations and modifications may be made to the above-described embodiments without departing substantially from the spirit and scope of the present application. All such modifications and variations are intended to be included herein within the scope of this disclosure and protected by the following claims.

I claim:

1. An internal bus structure comprising:
a plurality of master buses;
a plurality of masters, wherein each master bus is directly connected to two or more of the plurality of masters;
a plurality of slave buses;
at least one slave connected to each slave bus; and
a plurality of multi-bus interfaces corresponding to the slave buses, wherein each multi-bus interface is directly connected to one respective slave bus, each multi-bus interface multiplexing the plurality of master buses to the respective slave bus, wherein each multi-bus interface comprises:
a multi-bus arbiter having a plurality of inputs, each input corresponding to a respective master bus; and
a bridge connected between the multi-bus arbiter and the respective slave bus;
wherein the multi-bus arbiter further comprises:
a plurality of request buffers corresponding to the plurality of master buses, each request buffer capable of storing requests from a respective master bus;
a request selecting multiplexer having a first set of inputs configured to receive the requests directly from the plurality of master buses and a second set of inputs configured to receive the requests stored in the request buffers; and
a request phase arbiter configured to receive the requests from the plurality of master buses, provide a selection signal to the request selecting multiplexer for selecting a request from among the first set of inputs and second set of inputs, and provide a pending signal;
a data phase arbiter configured to receive the selection signal from the request phase arbiter, receive a wait signal from the slave bus, and output a data selection signal;
wait signal decode logic configured to receive the pending signal from the request phase arbiter, receive the wait signal from the slave bus, receive the data selection signal from the data phase arbiter, and output feedback wait signals to the plurality of master buses;
a write multiplexer configured to receive write signals from the plurality of master buses, receive the data selection signal from the data phase arbiter to select one of the write signals, and output the selected write signal to the slave bus; and
a read demultiplexer configured to receive a read signal from the slave bus, receive the data selection signal from the data phase arbiter to select one of the plurality of master buses to which the read signal is to be transferred, and output the read signal to the selected master bus.

2. An internal bus structure comprising:
a plurality of master buses;
a plurality of masters, wherein each master bus is directly connected to two or more of the plurality of masters;
a plurality of slave buses;
at least one slave connected to each slave bus; and
a plurality of multi-bus interfaces corresponding to the slave buses, wherein each multi-bus interface is directly connected to one respective slave bus, each multi-bus interface multiplexing the plurality of master buses to the respective slave bus, wherein each multi-bus interface comprises:
a multi-bus arbiter having a plurality of inputs, each input corresponding to a respective master bus; and
a bridge connected between the multi-bus arbiter and the respective slave bus;
a plurality of request buffers corresponding to the plurality of master buses, each request buffer capable of storing requests from a respective master bus;
a request selecting multiplexer having a first set of inputs configured to receive the requests directly from the plurality of master buses and a second set of inputs configured to receive the requests stored in the request buffers; and
a request phase arbiter configured to receive the requests from the plurality of master buses, provide a selection signal to the request selecting multiplexer for selecting a request from among the first set of inputs and second set of inputs, and provide a pending signal, wherein the request phase arbiter comprises:
a sampled request circuit;
a previous ownership circuit; and
a selection combinational logic circuit configured to receive a sampled request signal from the sampled request circuit and a previous owner signal from the previous ownership circuit, the selection combinational logic circuit further configured to output said pending signal and said selection signal.

3. The internal bus structure of claim 2, wherein the sampled request circuit includes a plurality of request inputs corresponding to the plurality of master buses, the sampled request signal output from the sampled request circuit including one bit for each master bus, and wherein the previous ownership signal output from the previous ownership circuit includes an encoded signal representing which one of the master buses was the previous owner of the slave bus.

4. An internal bus structure comprising:
a plurality of master buses;
at least one master connected to each master bus;
a plurality of slave buses;
at least one slave connected to each slave bus; and
a plurality of multi-bus interfaces each multi-bus interface corresponding to a respective slave bus, each multi-bus interface multiplexing the plurality of master buses to the respective slave bus;
wherein each multi-bus interface comprises a multi-bus arbiter having a plurality of inputs respectively corresponding to the plurality of master buses; and
wherein the multi-bus arbiter of each multi-bus interface comprises:
a plurality of request buffers corresponding to the plurality of master buses, each request buffer capable of storing requests from a respective master bus;
a request selecting multiplexer having a first set of inputs configured to receive the requests directly from the plurality of master buses and a second set of inputs configured to receive the requests stored in the request buffers;
a request phase arbiter configured to receive the requests from the plurality of master buses, provide a selection signal to the request selecting multiplexer for selecting a request from among the first set of inputs and second set of inputs, and provide a pending signal;
a data phase arbiter configured to receive the selection signal from the request phase arbiter, receive a wait signal from the slave bus, and output a data selection signal;
wait signal decode logic configured to receive the pending signal from the request phase arbiter, receive the wait signal from the slave bus, receive the data selection signal from the data phase arbiter, and output feedback wait signals to the plurality of master buses;

a write multiplexer configured to receive write signals from the plurality of master buses, receive the data selection signal from the data phase arbiter to select one of the write signals, and output the selected write signal to the slave bus; and a read demultiplexer configured to receive a read signal from the slave bus, receive the data selection signal from the data phase arbiter to select one of the plurality of master buses to which the read signal is to be transferred, and output the read signal to the selected master bus.

5. The internal bus structure of claim 4, wherein the request phase arbiter comprises:
a sampled request circuit;
a previous ownership circuit; and
a selection combinational logic circuit configured to receive a sampled request signal from the sampled request circuit and a previous owner signal from the previous ownership circuit, the selection combinational logic circuit further configured to output said pending signal and said selection signal.

6. The internal bus structure of claim 5, wherein the sampled request circuit includes a plurality of request inputs corresponding to the plurality of master buses, the sampled request signal output from the sampled request circuit including one bit for each master bus, and wherein the previous ownership signal output from the previous ownership circuit includes an encoded signal representing which one of the master buses was the previous owner of the slave bus.

7. The internal bus structure of claim 4, further comprising a plurality of bus arbiters, each bus arbiter corresponding to a respective master bus for providing a first level of arbitration for arbitrating requests from the at least one master on the respective master bus to grant ownership of the master bus to one of the at least one requesting master.

8. The internal bus structure of claim 7, wherein the first multi-bus interface and the second multi-bus interface provide a second level of arbitration for granting ownership of the respective slave bus.

9. An internal bus structure comprising:
a plurality of master buses;
at least one master connected to each master bus;
a plurality of slave buses;
at least one slave connected to each slave bus; and
a plurality of multi-bus interfaces each multi-bus interface corresponding to a respective slave bus, each multi-bus interface multiplexing the plurality of master buses to the respective slave bus;
wherein each multi-bus interface comprises a multi-bus arbiter having a plurality of inputs respectively corresponding to the plurality of master buses; and
wherein the multi-bus arbiter of each multi-bus interface comprises:
a plurality of request buffers corresponding to the plurality of master buses, each request buffer capable of storing requests from a respective master bus;
a request selecting multiplexer having a first set of inputs configured to receive the requests directly from the plurality of master buses and a second set of inputs configured to receive the requests stored in the request buffers;
a request phase arbiter configured to receive the requests from the plurality of master buses, provide a selection signal to the request selecting multiplexer for selecting a request from among the first set of inputs and second set of inputs, and provide a pending signal;
wherein the request phase arbiter comprises:
a sampled request circuit;
a previous ownership circuit; and
a selection combinational logic circuit configured to receive a sampled request signal from the sampled request circuit and a previous owner signal from the previous ownership circuit, the selection combinational logic circuit further configured to output said pending signal and said selection signal.

10. The internal bus structure of claim 9, wherein the sampled request circuit includes a plurality of request inputs corresponding to the plurality of master buses, the sampled request signal output from the sampled request circuit including one bit for each master bus, and wherein the previous ownership signal output from the previous ownership circuit includes an encoded signal representing which one of the master buses was the previous owner of the slave bus.

* * * * *